United States Patent
Wang et al.

(10) Patent No.: US 10,416,316 B1
(45) Date of Patent: Sep. 17, 2019

(54) METHOD AND APPARATUS FOR DETERMINING FRAME TIMING

(71) Applicant: Marvell International Ltd., Hamilton (BM)

(72) Inventors: Yongsong Wang, Shanghai (CN); Zhike Jia, Fremont, CA (US); Jian Cheng, Shanghai (CN); Juhong Xing, Shanghai (CN); Mobo Qiu, Shanghai (CN)

(73) Assignee: Marvell International Ltd., Hamilton (BM)

( * ) Notice: Subject to any disclaimer, the term of this patent is extended or adjusted under 35 U.S.C. 154(b) by 470 days.

(21) Appl. No.: 15/200,942

(22) Filed: Jul. 1, 2016

Related U.S. Application Data (60) Provisional application No. 62/189,332, filed on Jul. 7, 2015.

(51) Int. Cl.
*G01S 19/30* (2010.01)
*G01S 19/20* (2010.01)

(52) U.S. Cl.
CPC ............... *G01S 19/30* (2013.01); *G01S 19/20* (2013.01)

(58) Field of Classification Search
CPC .................................. G01S 19/20; G01S 19/30
See application file for complete search history.

(56) References Cited

U.S. PATENT DOCUMENTS

| | | | | |
|---|---|---|---|---|
| 5,931,889 A * | 8/1999 | Misra | ............ | G01S 19/20 342/358 |
| 6,297,770 B1 * | 10/2001 | Ueda | ............ | G01S 19/05 342/357.62 |
| 6,532,251 B1 * | 3/2003 | King | ............ | G01S 19/24 342/357.31 |
| 7,161,532 B2 * | 1/2007 | Gomm | ............ | G01S 19/20 342/357.25 |
| 2008/0013605 A1 * | 1/2008 | Lin | ............ | G01S 19/30 375/149 |
| 2010/0328152 A1 * | 12/2010 | Abraham | ............ | G01S 5/0036 342/357.64 |
| 2014/0247185 A1 * | 9/2014 | Achanta | ............ | G01S 19/20 342/357.58 |

* cited by examiner

*Primary Examiner* — Gregory C. Issing (57) ABSTRACT

Aspects of the disclosure provide a method of determining frame timing of one or more signals from one or more respective transmitters. The method determining first observation windows that correspond to first candidate segments of the one or more signals; calculating a first set of accumulated signal patterns, each accumulated signal pattern of the first set of accumulated signal patterns being calculated based on signal patterns in a respective subset of the first candidate segments of the one or more signals; determining whether a first set of accumulated synchronization words derived from the first set of accumulated signal patterns is consistent with a first set of corresponding benchmark synchronization words; and determining the frame timing of the one or more signals based on timing of the first observation windows when the first set of accumulated synchronization words is consistent with the first set of corresponding benchmark synchronization words.

10 Claims, 6 Drawing Sheets

METHOD AND APPARATUS FOR DETERMINING FRAME TIMING

INCORPORATION BY REFERENCE

This present disclosure claims the benefit of U.S. Provisional Application No. 62/189,332, "Method and Device for Frame Synchronization in Weak GNSS Signal Circumstance" filed on Jul. 7, 2015, which is incorporated herein by reference in its entirety.

FIELD

This disclosure relates generally to a receiver. More specifically, the disclosure relates to determining frame timing of one or more signals received by the receiver.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a satellite-based positioning system, such as the U.S. Global Positioning System (GPS), the Russian GLObal NAvigation Satellite System (GLONASS), the Chinese BeiDou-2 Navigation System (BDS), or a positioning system implemented based on a time-of-arrival (TOA) principle, a satellite positioning receiver receives broadcasted navigation data and ranging codes from multiple satellites detectable by the receiver and determines an estimated position of the receiver with respect to the transmitting satellites based on the received navigation data and ranging codes. In many positioning systems, navigation data are organized as a superframe, which can be divided into data frames and may be further divided into sub-frames. In many positioning systems, each sub-frame may include a predetermined bit sequence usable for indicating the boundaries of the sub-frames. The predetermined bit sequence is usually referred to as frame synchronization bits or a frame synchronization sequence (or simplified as a synchronization sequence in this disclosure), and a data word containing the frame synchronization sequence is usually referred to as a frame synchronization word (or simplified as a synchronization word in this disclosure).

Moreover, an indicator of the performance of a satellite positioning receiver is the Time-to-First-Fix (TTFF). The TTFF measures how long it takes a receiver to provide an estimated position after being activated. In some applications, the TTFF depends on many factors, including how long the receiver takes to successfully identify the frame synchronization sequence from the received navigation signals. When the signal strengths of the received navigation signals are weak or the signal quality thereof is substandard due to blocked signal paths, multipath interferences, or the like, the satellite positioning receiver may spend a significant amount of time trying to identify the frame synchronization sequence, and thus the TFTT may be increased.

SUMMARY

Aspects of the disclosure provide a method of determining frame timing of one or more signals. The method includes receiving the one or more signals from one or more respective transmitters; determining first observation windows that correspond to first candidate segments of the one or more signals; calculating a first set of accumulated signal patterns, each accumulated signal pattern of the first set of accumulated signal patterns being calculated based on signal patterns in a respective subset of the first candidate segments of the one or more signals; determining whether a first set of accumulated synchronization words derived from the first set of accumulated signal patterns is consistent with a first set of corresponding benchmark synchronization words; and determining the frame timing of the one or more signals based on timing of the first observation windows when the first set of accumulated synchronization words is consistent with the first set of corresponding benchmark synchronization words.

In an embodiment, the method further includes: determining second observation windows that correspond to second candidate segments of the one or more signals when at least one of the first set of accumulated synchronization words is inconsistent with a corresponding benchmark synchronization word of the first set of corresponding benchmark synchronization words; calculating a second set of accumulated signal patterns, each accumulated signal pattern of the second set of accumulated signal patterns being calculated based on signal patterns in a respective subset of the second candidate segments of the one or more signals; determining whether a second set of accumulated synchronization words derived from the second set of accumulated signal patterns is consistent with a second set of corresponding benchmark synchronization words; and determining the frame timing of the one or more signals based on timing of the second observation windows when the second set of accumulated synchronization words is consistent with the second set of corresponding benchmark synchronization words.

In an embodiment, In an embodiment, a signal pattern in a candidate segment of a corresponding signal is calculated based on the following equation:

$$\text{cross}(k) = I(k-1)*I(k) + Q(k-1)*Q(k),$$

index "k" representing a k-th bit in a candidate segment, cross(k) representing a k-th bit of the signal pattern, I(k−1) and I(k) representing the in-phase data stream of the corresponding signal at the (k−1)-th bit and the k-th bit in the candidate segment, and Q(k−1) and Q(k) representing the quadrature-phase data stream of the corresponding signal at the (k−1)-th bit and the k-th bit in the candidate segment.

In an embodiment, calculating an accumulated signal pattern is performed based on the following equation:

$$\text{cross}_{sum}(k) = \sum_{m=1}^{M} \sum_{n=0}^{N-1} w(m, n) \text{cross}_m(k + n*T),$$

$\text{cross}_{sum}(k)$ representing a k-th bit of the accumulated signal pattern, index "m" representing a signal from a m-th transmitter, index "n" representing a signal pattern based on an n-th sub-frame, w(m, n) representing a weighting function for the signal from the m-th transmitter at the n-th sub-frame, and number "T" representing a number of bits in a sub-frame such that a next observation window would be T bits after a current observation window.

In an embodiment, determining the first observation windows includes: identifying a set of synchronization sequences, one synchronization sequence for each one of the one or more signals, such that time gaps between any two of the set of synchronization sequences are less than a threshold; and determining the first observation windows based on the set of synchronization sequences.

In an embodiment, determining the first observation windows includes: identifying a synchronization sequence in a first signal of the one or more signals; determining an observation window corresponding to the first signal of the one or more signals based on the identified synchronization sequence; calculating relative delay information of the one or more signals based on positioning assist information indicating locations or movements of the one or more transmitters; and determining other observation windows of the first observation windows based on the observation window corresponding to the first signal and the relative delay information of the one or more signals.

Aspects of the disclosure provide an apparatus for determining frame timing of one or more signals received from one or more respective transmitters. The apparatus includes circuitry configured to: determine first observation windows that that correspond to first candidate segments of the one or more signals, calculate a first set of accumulated signal patterns, each accumulated signal pattern of the first set of accumulated signal patterns being calculated based on signal patterns in a respective subset of the first candidate segments of the one or more signals, determine whether a first set of accumulated synchronization words derived from the first set of accumulated signal patterns is consistent with a first set of corresponding benchmark synchronization words, and determine the frame timing of the one or more signals based on timing of the first observation windows when the first set of accumulated synchronization words is consistent with the first set of corresponding benchmark synchronization words.

Aspects of the disclosure provide a signal processing apparatus that includes a receiver and circuitry. The receiver is configured to receive one or more signals from one or more respective transmitters. The circuitry is configured to determine first observation windows that that correspond to first candidate segments of the one or more signals, calculate a first set of accumulated signal patterns, each accumulated signal pattern of the first set of accumulated signal patterns being calculated based on signal patterns in a respective subset of the first candidate segments of the one or more signals, determine whether a first set of accumulated synchronization words derived from the first set of accumulated signal patterns is consistent with a first set of corresponding benchmark synchronization words; and determine frame timing of the one or more signals based on timing of the first observation windows when the first set of accumulated synchronization words is consistent with the first set of corresponding benchmark synchronization words.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1A:
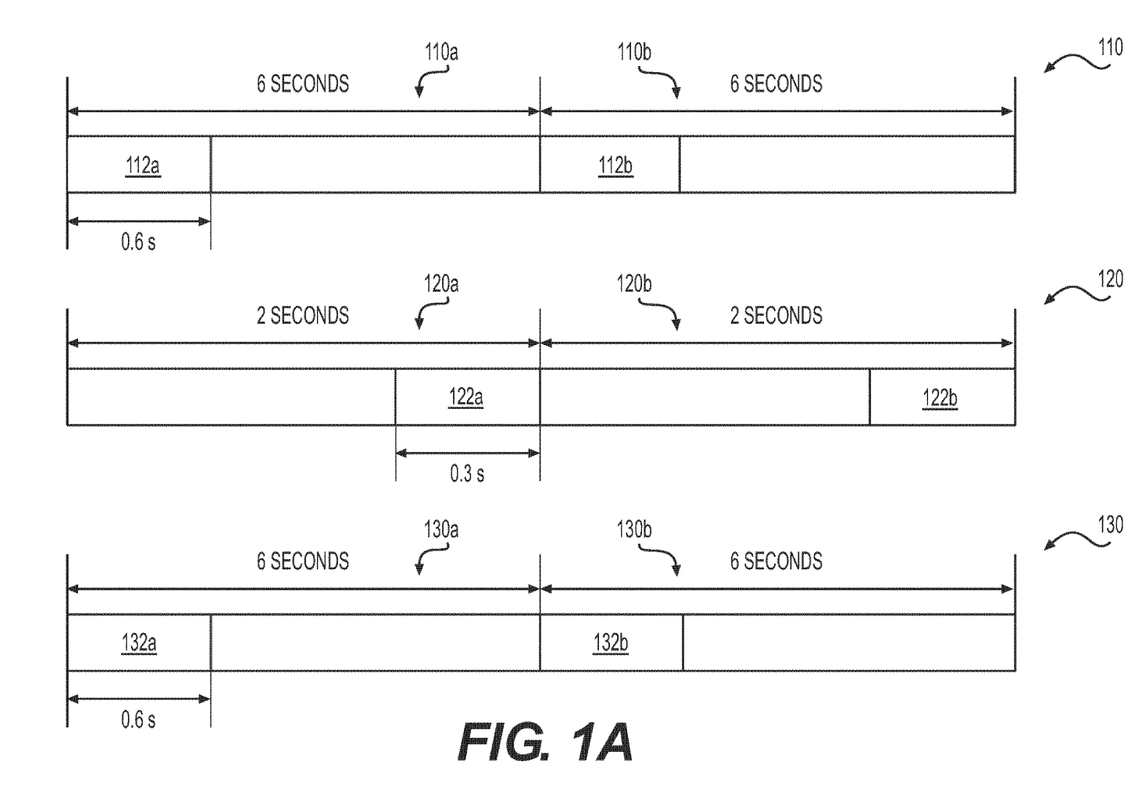
FIG. 1A shows frame structures of positioning signals of various positioning systems according to an embodiment of the disclosure.

FIG. 1A shows frame structures 110, 120, and 130 of navigation signals of various positioning systems according to an embodiment of the disclosure. Frame structures 110, 120, and 130 are illustrated as non-limiting examples to facilitate the illustration of various embodiments described in the present disclosure.

The frame structure 110 shows two sub-frames for transmitting the navigation data according to the U.S. Global Positioning System (GPS) standard. The frame structure 110 includes two sub-frames 110a and 110b. Each one of the sub-frame 110a and 110b begins with a 30-bit telemetry (TLM) word 112a and 112b that functions as a synchronization word in compliance with the GPS standard. Transmission of a sub-frame 110a or 110b takes about six seconds, and transmission of a TLM word 112a or 112b takes about 0.6 seconds.

The frame structure 120 shows two sub-frames for transmitting the navigation data according to Russian GLObal NAvigation Satellite System (GLONASS) standard. The frame structure 120 includes two sub-frames 120a and 120b. Each one of the sub-frame 120a and 120b ends with a 30-bit time mark 122a and 122b that functions as a synchronization word in compliance with the GLONASS standard. Transmission of a sub-frame 120a or 120b takes about 2 seconds, and transmission of a time mark 122a or 122b takes about 0.3 seconds.

The frame structure 130 shows two sub-frames for transmitting the navigation data according to the Chinese BeiDou-2 Navigation System (BDS) standard. The frame structure 130 includes two sub-frames 130a and 130b. Each one of the sub-frame 130a and 130b begins with a 30-bit pre word 132a and 132b that functions as a synchronization word in compliance with the BDS standard. Transmission of a sub-frame 130a or 130b takes about 6 seconds, and transmission of a pre word 132a or 132b takes about 0.6 seconds.

Figure 1B:
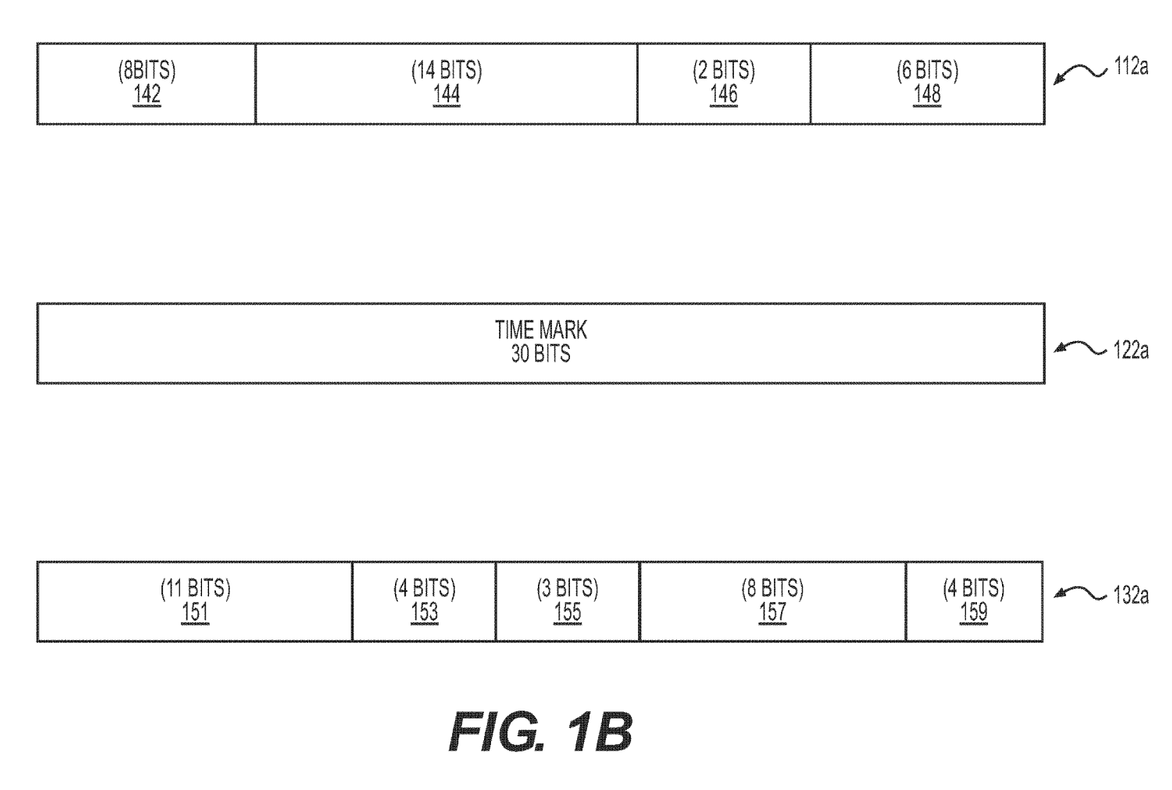
FIG. 1B shows frame structures of synchronization words of various positioning systems according to an embodiment of the disclosure.

FIG. 1B shows frame structures of synchronization words 112a, 122a, and 132a of various positioning systems according to an embodiment of the disclosure. Frame structures of synchronization words 112a, 122a, and 132a are illustrated as non-limiting examples to facilitate the illustration of various embodiments described in the present disclosure.

The TLM word 112a includes an 8-bit preamble 142, a 14-bit TLM message 144, 2 reserved bits 146, and a 6-bit parity check sequence 148. The 8-bit preamble 142 corresponds to synchronization bits that usually have excellent autocorrelation characteristics in order to increase the chance of successful detection thereof and reduce the chance of false positive result. For example, the 8-bit preamble 142 may be 10001011b according to the GPS standard. In some examples, the TLM words for all sub-frames within the same superframe and for concurrent superframes of all active satellites are the same.

The time mark 122a corresponds to a set of 30-bit long synchronization bits that usually have excellent autocorrelation characteristics in order to increase the chance of successful detection thereof and reduce the chance of false positive result. For example, the 30-bit time mark 122a may be 111110001101110101000010010110b according to the GLONASS standard. In some examples, the time marks for all sub-frames within the same superframe and for concurrent superframes of all active satellites are the same.

The pre word 132a includes an 11-bit preamble 151, 4 reserved bits 153, 3-bit frame identification information 155, 8-bit time information 157, and a 4-bit parity check sequence 159. The 11-bit preamble 151 corresponds to synchronization bits that usually have excellent autocorrelation characteristics in order to increase the chance of successful detection thereof and reduce the chance of false positive result. For example, the 11-bit preamble 151 may be 11100010010b according to the BDS standard. In some examples, the pre words for concurrent sub-frames of all active satellites are the same. However, in some examples, because the frame identification information 155 and time information 154 in each pre word are time dependent, the pre words for sub-frames transmitted at different time are different.

Because the synchronization words transmitted from different satellites and/or at different time in a particular positioning system may be duplicates of one another, the signal patterns in the corresponding segments of the received navigation signals can be added together to increase the chance of successful detection of the synchronization word. In some examples when some of the received navigation signals are weak due to the condition of the transmission channels or interferences, the signal pattern of the same synchronization word may be reinforced by adding these week signals together. Accordingly, frame timing of the received navigation signals may be determined based on accumulating navigation signals from different satellites, and the chance for prompt and successful frame synchronization can be improved.

Figure 1C:
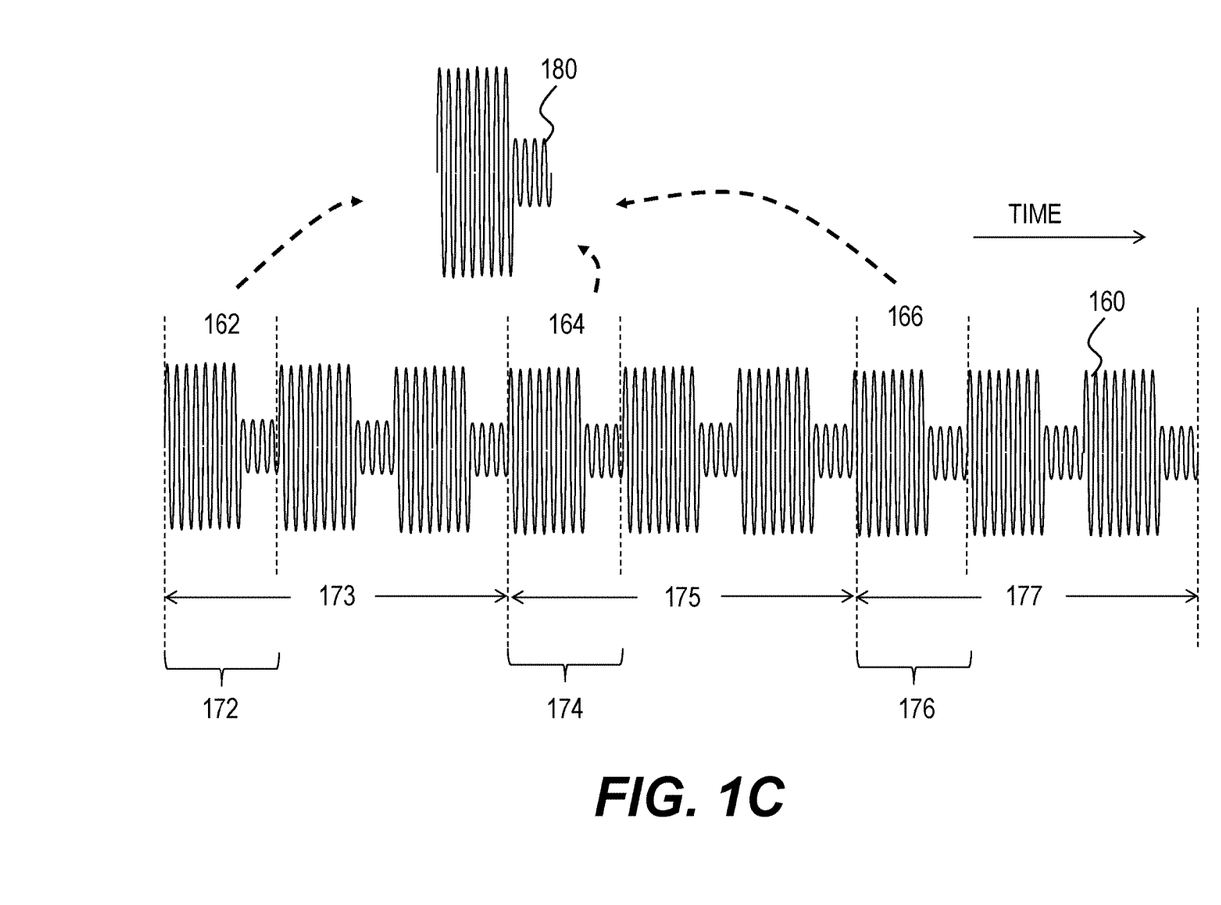
FIG. 1C shows a timing diagram of an example navigation signal and corresponding observation windows according to an embodiment of the disclosure.

FIG. 1C shows a timing diagram of an example navigation signal 160 and corresponding observation windows 172, 174, and 176 according to an embodiment of the disclosure. FIG. 1C is a non-limiting example and is not depicted according to an actual waveform or scale. In some examples, in order to determine the frame timing of the received navigation signal 160, a receiver, such as a receiver 220 in FIG. 2, after detecting a possible synchronization word within the navigation signal 160, the navigation signal 160 is divided into candidate sub-frames 173, 175, and 177. A set of observations windows 172, 174, and 176 for candidate sub-frames 173, 175, and 177 is determined accordingly consistent with the standards of one or more satellite positioning systems as illustrated in FIGS. 1A and 1B, for example. The observations windows 172, 174, and 176 correspond to candidate segments 162, 164, and 166 of the navigation signal 160 where the same synchronization word may be detected by the receiver. As such, the receiver would be able to direct its computation resources to determine presence or absence of the synchronization word within the observations windows.

Furthermore, as discussed above, an accumulated signal pattern 180 is calculated based on adding the signal patterns of the navigation signal 160 within the candidate segments 162, 164, and 166. If the candidate segments 162, 164, and 166 indeed carry the same synchronization word and ideally have the same waveform, the accumulated signal pattern 180 helps to average out random noises and thus increase the chance of successful detection of the synchronization word. On the other hand, if the candidate segments 162, 164, and 166 correspond to different waveforms, the accumulated signal pattern 180 also helps to decrease chance of false positive detection of the synchronization word.

Figure 2:
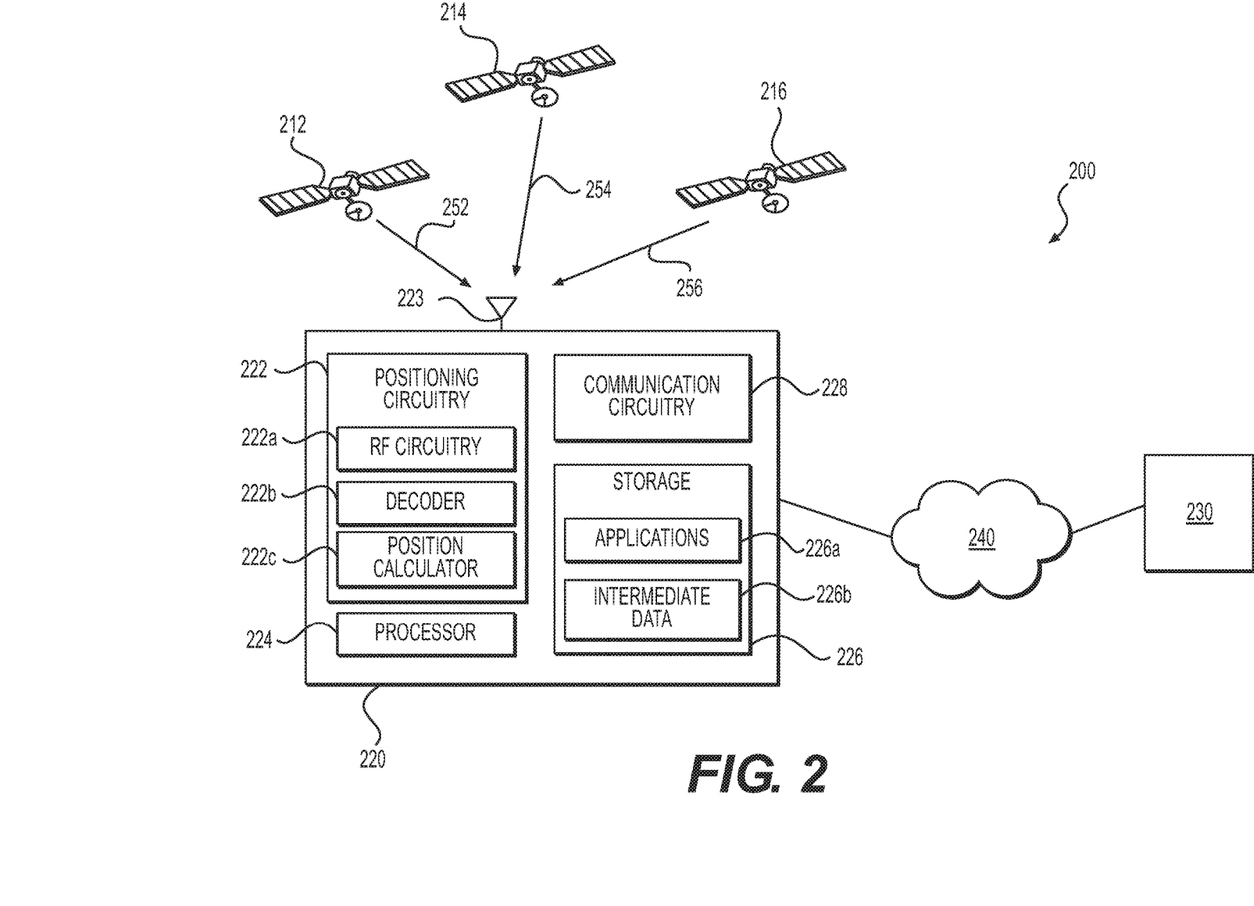
FIG. 2 shows a system block diagram of a positioning system example according to an embodiment of the disclosure.

FIG. 2 shows a system block diagram of a positioning system example 200 according to an embodiment of the disclosure. The positioning system 200 includes satellites 212, 214, and 216, a receiver 220, a server 230, and a data network 240. In some examples, the receiver 220 and the satellites 212, 214, and 216 are compatible with the standards of one or more satellite positioning systems, including the GPS, GLONASS, BDS, or the like.

In FIG. 2, each one of the satellites 212, 214, and 216 orbits the Earth and broadcasts navigation signals 252, 254, and 256 toward the surface of the Earth. The receiver 220 receives the broadcasted navigation signals 252, 254, and 256 and determines a position of the receiver 220 according to the broadcasted navigation signals 252, 254, and 256. The broadcasted navigation signals 252, 254, and 256 may include navigation data and ranging codes in compliance with a predetermined satellite positioning system standard. In some examples, the navigation data may include ephemeris data applicable to the transmitting satellite, almanac data applicable to the entire satellite constellation, and/or time information indicating a transmitting time of a particular data frame or sub-frame that carries the time information. In some examples, the navigation data may also include health information with respect to the transmitting satellite.

In some examples, in order to extract the navigation data from the broadcasted navigation signals 252, 254, and 256, the receiver 220 performs a frame synchronization process to identify the boundaries of various data frames and/or sub-frames, which may include first identifying the frame synchronization words or the frame synchronization sequences in the broadcasted navigation signals 252, 254, and 256. The frame structures of some example positioning systems were illustrated with reference to FIGS. 1A and 1B.

In some examples according to the GPS standard, each satellite transmits an L-band carrier signal modulated by data bits of twenty milliseconds that spread by a pseudo-random (PRN) code (i.e., the ranging code). Each bit of a unique PRN code of 1023 bits long represents a time mark about every microsecond. The entire PRN code sequence repeats once every millisecond. Every twentieth cycle, or twenty milliseconds, the entire PRN code sequence may change phase and is used to encode the navigation data at a 50 bits per second. Other satellite-based positioning systems may transmit pseudo-random codes as ranging codes in similar manners.

The server 230 is communicatively coupled with the receiver 220 through the data network 240. The data network 240 may include one or more of wireless network according to wireless communication protocols such as Global System for Mobile communication (GSM), Code Division Multiple Access (CDMA), Wideband Code Division Multiple Access (WCDMA), Time Division Synchronous Code Division Multiple Access (TD-SCDMA), Long Term Evolution (LTE), Time Division Long Term Evolution (TD-LTE); Institute of Electrical and Electronics Engineers (IEEE) 802.11 based protocol, IEEE 802.15 based protocol, and the like; or one or more of wired network according to wired communication protocols such as ETHERNET, Universal Serial Bus (USB), IEEE-1394, and the like.

The server 230 may store positioning assist information such as a copy of valid navigation data received from one or more satellites and/or various positioning parameters derived from the navigation data. In some examples, the receiver 220 may obtain the navigation data from the server 230 through the data network 240 instead of, or in addition to, receiving the same from the satellites. In some examples, the receiver 220 may obtain the positioning parameters from the server 230 through the data network 240 instead of, or in addition to, calculating the same based on received navigation data. Because the data rate through the data network 240 may be at least hundreds times faster than that of satellite broadcasting, the receiver 220 may be able to achieve a shorter TTFF by using the navigation data and/or positioning parameters received from the server 230.

The receiver 220 includes positioning circuitry 222, an antenna 223, a processor 224, a storage 226, and communication circuitry 228.

The positioning circuitry 222 includes radio frequency (RF) circuitry 222a, a decoder 222b, and a position calculator 222c. The RF circuitry 222a is electrically coupled with the antenna 223. The RF circuitry 222a may receive the broadcasted navigation signals 152, 154, and 156 through the antenna 223 and convert the received navigation signals 252, 254, and 256 to a digital form. The decoder 222b may analyze the navigation signals 252, 254, and 256 in the digital form, determine frame timing of the navigation signals 252, 254, and 256, and generate decoded ranging code and decoded navigation data based on the determined frame timing and the navigation signals 252, 254, and 256. The position calculator 222c may calculate a current position of the receiver 220 based on the decoded ranging codes and navigation data.

The processor 224 includes a single processing core or multiple processing cores. The processor 224 is configured to execute an operating system and various client applications to perform various functions. In some examples, the processor 224 by executing instructions is capable of managing and processing the navigation data into a form that is usable by the positioning circuitry 222. For example, the processor 224 may execute a corresponding application to calculate the satellite ephemeris based on the decoded navigation data. In some examples, the processor 224 by executing instructions is capable of performing a predetermined function based on the position determined by the positioning circuitry 222.

The storage 226 is used to store an operating system (not shown), client applications 226a, intermediate data 226b, and/or other data, intermediate data, or software programs. In some examples, storage 226 includes a non-transitory computer readable medium, such as a semiconductor or solid-state memory, a random access memory (RAM), a read-only memory (ROM), a hard disk, an optical disk, or other suitable storage medium. In some embodiments, the storage 226 includes a plurality of non-transitory computer readable mediums listed above.

The communication circuitry 228 includes a receiving circuit (not shown), a transmitting circuit (not shown), a baseband circuit (not shown), and the like, to enable wired and/or wireless communication with the data network 240. In some examples, the communication circuitry 228 is configured to communicate with the network 240 according to one or more communication protocols, such as GSM, CDMA, WCDMA, TD-SCDMA, LTE, TD-LTE, an IEEE 802.11 based protocol, an IEEE 802.15 based protocol, or the like.

The receiver 220 is configured to perform a frame synchronization process in order to determine frame timing of the received navigation signals 252, 254, and 256, such that the navigation signals 252, 254, and 256 may be decoded accordingly. Three navigation signals 252, 254, and 256 are illustrated as a non-limiting example. In some examples, the receiver may receive and process one or more navigation signals.

For example, the RF circuitry 222a of the positioning circuitry 222 may receive the navigation signals 252, 254, and 256 from respective transmitting satellites 212, 214, and 216. The navigation signals 252, 254, and 256 may be transmitted as RF signals, and the RF circuitry 222a may convert the navigation signals 252, 254, and 256 to a digital form. For example, the RF circuitry 222a may output an in-phase digitized data stream (i.e., the "I data") and a quadrature-phase digitized data stream (i.e., the "Q data") that represent a corresponding navigation signal 252, 254, or 256. In some examples, the I data and Q data are generated based on a bit rate comparable to a bit rate of the synchronization word 112a, 122a, or 132a.

In some examples, the decoder 222b receives the navigation signals 252, 254, and 256 represented by respective I/Q data from the RF circuitry 222a. The decoder 222b may determine a set of observation windows that correspond to candidate segments of the navigation signals 252, 254, and 256 where the same synchronization word may be detected. In one example, for the navigation signal 252 from the satellite 212, the set of observation windows may include a predetermined number of candidate segments in the navigation signal 252 corresponding to the synchronization words of the predetermined number of consecutive sub-frames. In another example, for the navigation signals 252, 254, and 256 from the satellites 212, 214, and 216, the set of observation windows may include respective candidate segments in the navigation signal 252, 254, and 256 corresponding to the synchronization words of concurrent sub-frames. In some examples, the set of observation windows may include a predetermined number of candidate segments corresponding to sub-frames from different satellites at different time.

The decoder 222b may calculate a set of accumulated signal patterns, where each accumulated signal pattern of the set of accumulated signal patterns is calculated based on signal patterns in a respective subset of the candidate segments of the navigation signals 252, 254, and 256. For example, the decoder 122b may calculate a first accumulated signal pattern based on signal patterns in a first subset of the candidate segments, such as candidate segments corresponding to three consecutive sub-frames from three different satellites, hence nine candidate segments in total. The decoder 222b may calculate a second accumulated signal pattern based on signal patterns in a second subset of the candidate segments, such as candidate segments corresponding to next three consecutive sub-frames from three different satellites, hence also nine candidate segments in total.

Each subset of the candidate segments is chosen to correspond to the same synchronization word, and each accumulated signal pattern also corresponds to the same benchmark synchronization word. The suitable benchmark synchronization word can be determined based on the corresponding satellite positioning system standard as illustrated in FIGS. 1A and 1B, for example.

The decoder 222b may generate a set of accumulated synchronization words derived based on the set of accumulated signal patterns and determined whether the set of accumulated synchronization words is consistent with a corresponding set of benchmark synchronization words. For example, an accumulated signal pattern is decoded to obtain a decoded accumulated synchronization word, which is compared with a corresponding benchmark synchronization word. In some examples, all bits of the decoded accumulated synchronization word are compared with all bits of the benchmark synchronization word. In some examples, the decoder 222b may only compare the corresponding synchronization sequence and/or the corresponding parity check sequences of the decoded accumulated synchronization word with the corresponding portions of the benchmark synchronization word.

In an example according to the GPS or the BDS standard, the set of accumulated synchronization words is determined to be consistent with the corresponding benchmark synchronization words when two consecutive accumulated signal patterns and the corresponding benchmark synchronization words have matched synchronization sequences and matched parity check sequences. In an example according to the GLONASS standard, the set of accumulated synchronization words is determined to be consistent with the corresponding benchmark synchronization words when three consecutive accumulated signal patterns match the corresponding benchmark synchronization words.

In some examples, if the set of accumulated synchronization words is consistent with the corresponding benchmark synchronization words, the decoder 222b may determine frame timing of the navigation signals 252, 254, and 256 based on timing of the observation windows. For example, the decoder 222b may use the starting point of an observation window as a starting point of a frame for a corresponding navigation signal.

However, if at least one accumulated synchronization word of the set of accumulated synchronization words is inconsistent with the corresponding benchmark synchronization word, the decoder 222b may adjust the observations windows, calculate another set of accumulated signal patterns, generate another set of decoded accumulated synchronization words, and determine whether the another set of accumulated synchronization words is consistent with the corresponding benchmark synchronization words. Therefore, a second set of observations windows may be determined, a second set of accumulated signal patterns may be calculated accordingly, and a determination with respect to whether the second set of accumulated synchronization words is consistent with the corresponding benchmark synchronization word may be made. At this stage, if the second set of accumulated synchronization words is consistent with the benchmark synchronization word, the decoder 222b may determine the frame timing of the navigation signals 252, 254, and 256 based on timing of the second set of observation windows.

In some examples, the decoder 222b may calculate a signal pattern within a candidate segment of a received navigation signal based on the following equation:

$$\text{cross}(k) = I(k-1)*I(k) + Q(k-1)*Q(k).$$

The index "k" represents a k-th bit in the candidate segment. The cross(k) represents a k-th bit of the signal pattern. $I(k-1)$ and $I(k)$ represent the I data of the received navigation signal at the $(k-1)$-th bit and the k-th bit in the candidate segment. $Q(k-1)$ and $Q(k)$ represent the Q data of the received navigation signal at the $(k-1)$-th bit and the k-th bit within the candidate segment.

Furthermore, the decoder 222b may calculate an accumulated signal pattern based on the following equation:

$$\text{cross}_{sum}(k) = \sum_{m=1}^{M} \sum_{n=0}^{N-1} w(m,n) \text{cross}_m(k + n*T).$$

The $\text{cross}_{sum}(k)$ represents a k-th bit of the accumulated signal pattern. The index "m" represents a navigation signal from the m-th satellite. The index "n" represents the signal pattern based on the n-th sub-frame. The w(m, n) represents a weighting function for the navigation signal from the m-th satellite at the n-th sub-frame. The number T represents the number of bits in a sub-frame such that a next observation window would be T bits after a current observation window.

In some examples, T is set to 300 when the navigation signals comply with the GPS standard or the BDS standard. In some examples, T is set to 200 when the navigation signals comply with the GLONASS standard. Also, because the pre words for sub-frames transmitted at different time according to the BDS standard are different, N is set to 1 when the navigation signals comply with the BDS standard. In some examples, N is set to 2 or greater when the navigation signals comply with the GPS standard or the GLONASS standard.

In some examples, w(m, n) is set based on received power levels of the navigation signals. For example, w(m, n) may be set to a greater value for a navigation signal having a greater received power level.

Furthermore, the initial set of observation windows may be determined by the decoder 222b based on detecting one or more synchronization sequence from the received navigation signals.

In some examples, when the receiver 220 has downloaded valid positioning assist information from the server 230 or has valid positioning assist information in possession, the decoder 222a may first identify the synchronization sequence from a navigation signal (e.g., 252) broadcasted by a satellite transmitter (e.g., 212). The decoder 222a may then determine an observation window based on where in the navigation signal the synchronization sequence are identified. The decoder 222a may continue to determine one or more observation windows for the same navigation signal corresponding to various sub-frames. Meanwhile, the decoder 222a may determine relative transmission delays among the navigation signals 252, 254, and 256 based on the positions of various satellites, which are determined according to the positioning assist information. The decoder 222a may continue to determine one or more observation windows for other navigation signals based on the observation windows for the first navigation signal and relative transmission delays among the navigation signals.

In some examples according to the GPS or BDS standard, based on the positioning assist information, the position calculator 222c can determine a rough distance (e.g., a pseudo range) between each observable satellite and the receiver 220. Also, the decoder 222b can determine a rough transmitting time corresponding to the detected synchronization sequence. In some examples, a position deviation for the rough distance is within 150 km, and a time deviation for the rough transmitting time is within 2 seconds.

In some examples, a rough transmitting time tot, a receiving time $tor_i$, and a rough distance $\rho_i$ from a satellite $SV_i$ can be determined based on the following equation:

$$\rho_i = (tor_i - tot)*c.$$

Also, the rough transmitting time tot, a receiving time $tor_j$, and a rough distance $\rho_j$ from a satellite $SV_j$ can be determined based on the following equation:

$$\rho_j = (tor_j - tot)*c.$$

Accordingly, the receiving time $tor_j$ can be represented as:

$$tor_j = tor_i + \frac{\rho_l - \rho_i}{c}.$$

Therefore, an estimated relative transmission delay between the satellite $SV_j$ and the satellite $SV_i$ can be calculated based on $$\frac{\rho_l - \rho_i}{c}.$$

Accordingly, me observation windows for other navigation signals may be determined based on shifting the observation windows for the first navigation signal by the calculated relative transmission delays.

In some examples, when the receiver 220 does not have valid positioning assist information, the decoder 222a may first identify a set of synchronization sequences, one synchronization sequence for each one of the one or more signals, such that time gaps between any two of the set of synchronization sequences are less than a threshold. The decoder 222a may then determine the observation windows based on the set of synchronization sequences. In some examples, the decoder 222a may identify candidate synchronization sequences in the one of the one or more signals and select a subset of the candidate synchronization sequences based on the threshold as the set of synchronization sequences. The threshold is set to be sufficiently short such that the synchronization sequences and/or their corresponding synchronization words may have been transmitted by various satellites concurrently and are likely to have the same signal pattern. In some examples, the threshold is set to be 20 milliseconds (ms).

Moreover, if at least one of the set of accumulated signal patterns is inconsistent with the corresponding benchmark synchronization word, the decoder 222b may adjust the observation windows based on either shifting current observation windows for a predetermined number of bits, or determining the next set of observation windows from scratch as discussed above.

The frame synchronization performed by the decoder 222b of the positioning circuitry 222 illustrated above is described as a non-limiting example. In some examples, the frame synchronization described above can also be performed by the decoder 222b, other circuitry, the processor 224 executing the applications 226a, or any combination thereof. Also, the numbers of satellites, navigation signals, observation windows, and sub-frames illustrated above are described as non-limiting examples.

Figure 3:
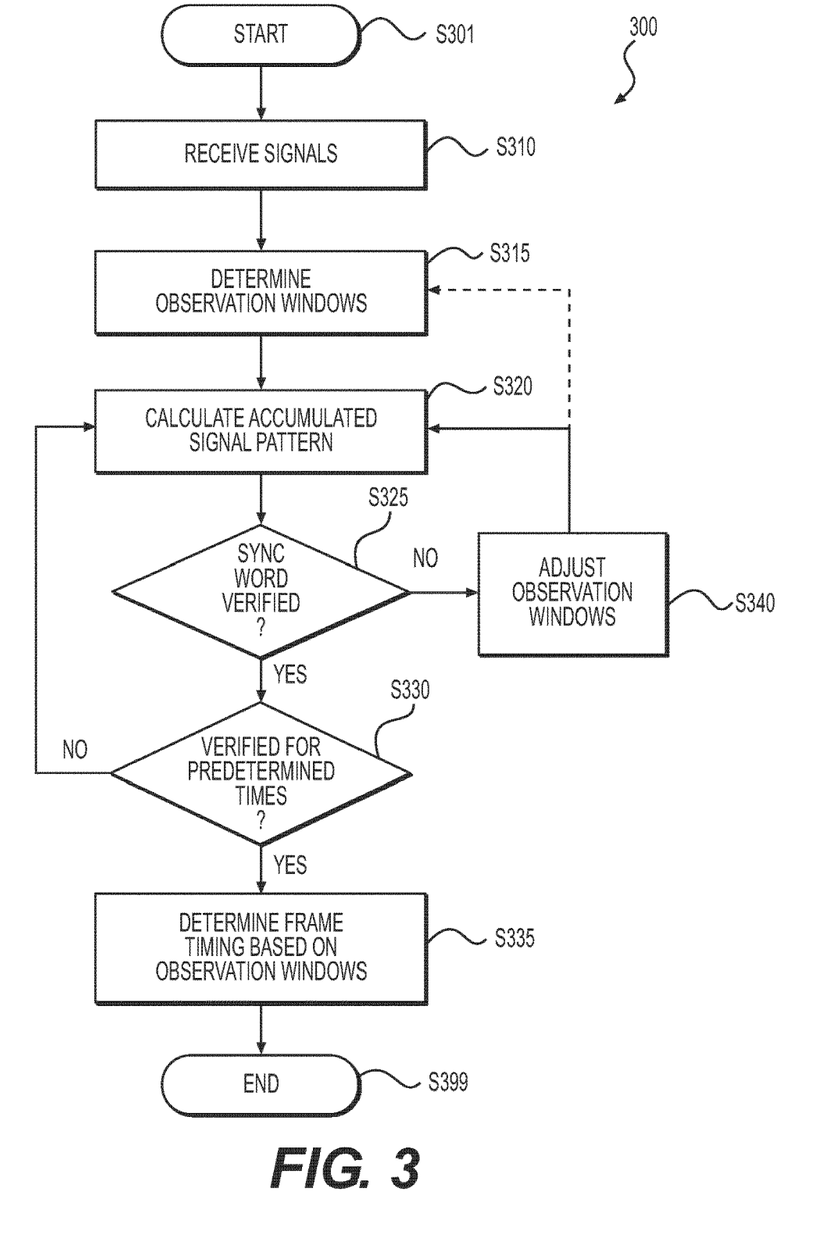
FIG. 3 shows a flow chart outlining a process example of identifying frame timing of one or more signals according to an embodiment of the disclosure.

FIG. 3 shows a flow chart outlining a process example 300 of identifying frame timing of one or more signals according to an embodiment of the disclosure. For example, the process 300 may be performed by a receiver such as the receiver 220. It is understood that additional operations may be performed before, during, and/or after the process 300 depicted in FIG. 3. The process 300 starts at S301 and proceeds to S310.

At S310, one or more signals from one or more respective transmitters are received. For example, a receiver 220 receives navigation signals 252, 254, and 256 from respective satellites 212, 214, and 216.

At S315, a first set of observation windows that corresponds to first candidate segments of the one or more signals is determined. For example, the decoder 222b determines a first set of observation windows that corresponds to candidate segments of the navigation signals 252, 254, and 256 as described above with reference to FIGS. 1A-2.

At S315, an accumulated signal pattern is calculated based on a first subset of the first set of observation windows. For example, the decoder 222b calculates a first accumulated signal pattern based on a first subset of the first set of observation windows as described above with reference to FIGS. 1A-2.

At S325, whether a decoded accumulated synchronization word derived from the accumulated signal pattern is consistent with a corresponding benchmark synchronization word is determined. For example, the decoder 222b determines whether a decoded accumulated synchronization word derived from the first accumulated signal pattern is consistent with a corresponding benchmark synchronization word as described above with reference to FIGS. 1A-2. In some examples, only the synchronization sequences of the synchronization words are compared. In some examples, both the synchronization sequences and the parity check sequences of the synchronization words are compared. In yet another embodiment, all bits of the synchronization words are compared.

At S325, when it is determined that the accumulated synchronization word is consistent with the corresponding benchmark synchronization word, the process proceeds to S330. When it is determined that the accumulated synchronization word is inconsistent with the corresponding benchmark synchronization word, the process proceeds to S340.

At S330, the positive result from S325 is recorded and whether a predetermined number of verified accumulated signal patterns has been recorded is determined. If a predetermined number of accumulated signal patterns has been calculated and verified in S320 and S330, the process proceeds to S335. Otherwise, the process proceeds to S320, where a next accumulated signal pattern is calculated based on another subset of observation windows.

Accordingly, S320, S325, and S330 are repetitively performed until a predetermined set of accumulated signal patterns is determined to be consistent with one or more corresponding benchmark synchronization words.

In some examples, a predetermined number of accumulated signal patterns may be determined at S315 before the process proceeds to S325. In some examples, the predetermined number of accumulated synchronization words may be compared with the corresponding benchmark synchronization words at S325 before the process proceeds to S330. In such scenario, when it is determined that all the accumulated synchronization words are consistent with the corresponding benchmark synchronization words, the process proceeds to S335, and S330 is thus omitted. When it is determined that at least one accumulated synchronization word is inconsistent with the corresponding benchmark synchronization word, the process proceeds to S340.

At S335, frame timing for the one or more signals is determined based on the timing of the observation windows. For example, the decoder 222b determines frame timing for the received navigation signal 252, 254, and 256 based on the observation windows when a predetermined set of accumulated synchronization words is determined to be consistent with the corresponding benchmark synchronization words as described above with reference to FIGS. 1A-2.

At S340, the observation windows are adjusted. In some examples, a new set of observation windows is determined based on shifting the previous set of observation windows by a predetermined number of bits, and the process proceeds to S320-S330 to calculate and verify whether a second set of accumulated synchronization words is consistent with the corresponding benchmark synchronization words. In some examples, a new set of observation windows is determined anew without referring to the previous set of observation windows. In such scenario, the process proceeds to S315 to determine a second set of observation windows from scratch, and then proceeds to S320-S330 to calculate and verify whether a second set of accumulated synchronization words is consistent with the corresponding benchmark synchronization words.

After S335, the process terminates at S399.

Figure 4:
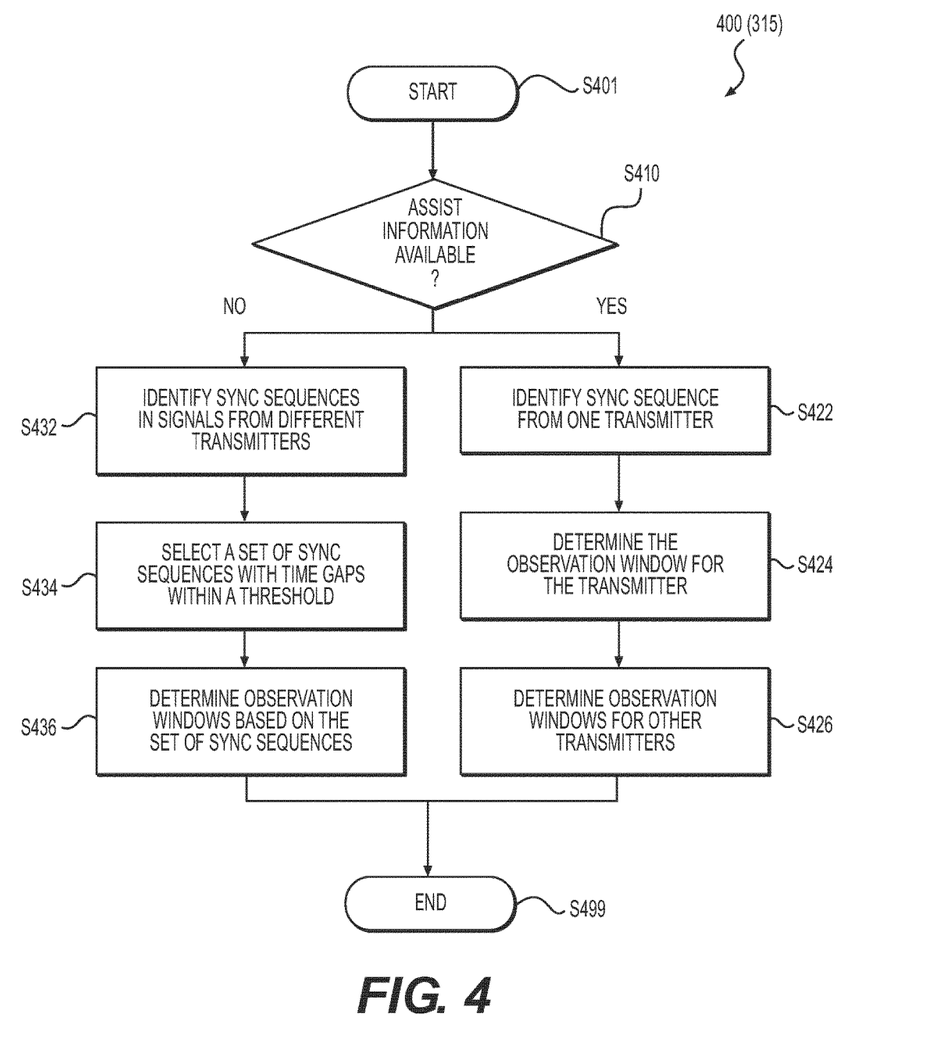
FIG. 4 shows a flow chart outlining a process example of determining observation windows corresponding to candidate segments of one or more received navigation signals according to an embodiment of the disclosure.

FIG. 4 shows a flow chart outlining a process example 400 of determining observation windows corresponding to candidate segments of one or more received navigation signals according to an embodiment of the disclosure. For example, the process 400 may be performed by a receiver such as the receiver 220. The process 400 may correspond to S315 in FIG. 3. It is understood that additional operations may be performed before, during, and/or after the process 400 depicted in FIG. 4. The process 400 starts at S401 and proceeds to S410.

At S410, it is determined whether valid positioning assist information is available to a receiver. For example, the decoder 222b or the processor 224 of the receiver 220 determines whether valid positioning assist information is stored in the storage 226. If the valid positioning assist information is available, the process proceeds to S422. If the valid positioning assist information is not available, the process proceeds to S432.

At S422, when the valid positioning assist information is available, a synchronization sequence of a first received signal from a particular transmitter is identified. For example, the decoder 222b identifies a synchronization sequence of a first navigation signal (e.g., the navigation signal 252) from a corresponding satellite 212 as described above with reference to FIGS. 1A-2.

At S424, an observation window for the first received signal from the corresponding transmitter is determined. For example, the decoder 222b determines an observation window for the first navigation signal 252 as described above with reference to FIGS. 1A-2.

At S426, more observation windows for other received signals from the other transmitters are determined. For example, the decoder 222b calculates estimated relative delays among the navigation signals 252, 254, and 256 based on the positioning assist information and determines the observation window for the navigation signals 254 and 256 as described above with reference to FIGS. 1A-2.

At S432, when the valid positioning assist information is not available, a plurality of synchronization sequences of received signal from all observable transmitters is identified. For example, the decoder 222b identifies a plurality of synchronization sequences from the navigation signals 252, 254, and 256 as described above with reference to FIGS. 1A-2.

At S434, a set of synchronization sequences among the identified synchronization sequences is selected such that time gaps between any two of the synchronization sequences are within a threshold. For examiner, the decoder 222b determines a set of synchronization sequences of the navigation signals 252, 254, and 256 having time gaps within a predetermined threshold, such as 20 ms, as described above with reference to FIGS. 1A-2.

At S436, observation windows for the received signals are determined based on the selected set of synchronization sequences. For example, the decoder 222b determines the observation windows based on the selected set of synchronization sequences of the navigation signals 252, 254, and 256 as described above with reference to FIGS. 1A-2

After S426 or S436, the process terminates at S499.

In some examples, at least a portion of the process 300 or the process 400 is performed by hardware circuitry that is part of the decoder 222b. In some examples, at least a portion of the process 300 or the process 400 is performed by a processor, such as the processor 224 or a processor embedded in the positioning circuitry 222, executing a set of instructions stored in a non-transitory computer-readable medium, such as the storage 226 or the like embedded in the positioning circuitry 222.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of determining timing of synchronization portions of a target signal, the method comprising:
   receiving one or more signals, including the target signal, from one or more respective transmitters;
   determining first observation time intervals that correspond to a first estimation of the timing of the synchronization portions of the target signal;
   identifying first segments of the one or more signals that correspond to the first observation time intervals;
   calculating first accumulated signal patterns, each accumulated signal pattern of the first accumulated signal patterns being calculated based on a respective subset of first segments within the identified first segments;
   determining whether all of first accumulated synchronization words respectively derived from the first accumulated signal patterns match first corresponding ones of predetermined synchronization words; and
   determining the first estimation of the timing of the synchronization portions of the target signal as the timing of the synchronization portions of the target signal in response to determining all of the first accumulated synchronization words match the first corresponding ones of the predetermined synchronization words.

2. The method of claim 1, further comprising:
   determining second observation time intervals that correspond to a second estimation of the timing of the synchronization portions of the target signal in response to determining that not all of the first accumulated synchronization words match the first corresponding ones of the predetermined synchronization words;
   identifying second segments of the one or more signals that correspond to the second observation time intervals;
   calculating second accumulated signal patterns, each accumulated signal pattern of the second accumulated signal patterns being calculated based on a respective subset of second segments within the identified second segments;
   determining whether all of second accumulated synchronization words respectively derived from the second accumulated signal patterns match second corresponding ones of the predetermined synchronization words; and determining the second estimation of the timing of the synchronization portions of the target signal as the timing of the synchronization portions of the target signal in response to determining all of the second accumulated synchronization words match the second corresponding ones of the predetermined synchronization words.

3. The method of claim 1, wherein
a signal pattern in a particular segment of the identified first segments is calculated based on the following equation:

$$\text{cross}(k) = I(k-1) * I(k) + Q(k-1) * Q(k),$$

index "k" representing a k-th bit in the particular segment,
cross(k) representing a k-th bit of the signal pattern,
I(k−1) and I(k) representing the in-phase data stream of the corresponding signal at the (k−1)-th bit and the k-th bit in the particular segment, and
Q(k−1) and Q(k) representing the quadrature-phase data stream of the corresponding signal at the (k−1)-th bit and the k-th bit in the particular segment, and
calculating an accumulated signal pattern is performed based on the following equation:

$$\text{cross}_{sum}(k) = \sum_{m=1}^{M} \sum_{n=0}^{N-1} w(m, n) \text{cross}_m(k + n * T),$$

$\text{cross}_{sum}(k)$ representing a k-th bit of the accumulated signal pattern,
index "m" representing a signal from a m-th transmitter,
index "n" representing a signal pattern based on an n-th sub-frame,
w(m, n) representing a weighting function for the signal from the m-th transmitter at the n-th sub-frame, and
number "T" representing a number of bits in a sub-frame such that a next observation time interval would be T bits after a current observation time interval.

4. The method of claim 3, further comprising:
setting T to 300 when the one or more signals comply with Global Positioning System or BeiDou Navigation Satellite System standard; and
setting T to 200 when the one or more signals comply with GLObal NAvigation Satellite System standard.

5. The method of claim 3, further comprising:
setting N to 1 when the one or more signals comply with a BeiDou Navigation Satellite System standard; and
setting N to 2 or greater when the one or more signals comply with Global Positioning System or GLObal NAvigation Satellite System standard.

6. The method of claim 3, further comprising:
setting w(m, n) based on received power levels of the one or more signals.

7. The method of claim 1, wherein determining the first observation time intervals comprises:
identifying a set of synchronization sequences, one synchronization sequence for each one of the one or more signals, such that time gaps between any two of the set of synchronization sequences are less than a threshold; and
determining the first observation time intervals based on the identified set of synchronization sequences.

8. The method of claim 7, wherein identifying the set of synchronization sequences comprises:
identifying candidate synchronization sequences in the target signal; and
selecting a subset of the candidate synchronization sequences based on the threshold as the set of synchronization sequences.

9. The method of claim 7, wherein the threshold is 20 milliseconds.

10. The method of claim 1, wherein determining the first observation time intervals comprises:
identifying a synchronization sequence in a first signal of the one or more signals;
determining an observation time interval corresponding to the first signal of the one or more signals based on the identified synchronization sequence;
calculating relative delay information of the one or more signals based on positioning assist information indicating locations or movements of the one or more transmitters; and
determining other observation time intervals of the first observation time intervals based on the determined observation time interval corresponding to the first signal and the relative delay information of the one or more signals.

* * * * *